United States Patent
Lin et al.

(10) Patent No.: US 7,933,239 B2
(45) Date of Patent: Apr. 26, 2011

(54) FFT-SIZE DETECTOR AND FFT-SIZE DETECTION METHOD AND CELL SEARCH APPARATUS AND CELL SEARCH METHOD IN CELLULAR SYSTEM

(75) Inventors: Huei-Jin Lin, Taichung (TW); Wei Ping Chuang, Kaohsiung (TW); Jiun-Yo Lai, Taichung (TW); Pang-An Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 985 days.

(21) Appl. No.: 11/812,046

(22) Filed: Jun. 14, 2007

(65) Prior Publication Data
US 2008/0310525 A1    Dec. 18, 2008

(51) Int. Cl.
*H04B 7/00* (2006.01)
*H04B 7/208* (2006.01)
*H04W 4/00* (2009.01)
*H04J 1/00* (2006.01)
*H04J 3/06* (2006.01)

(52) U.S. Cl. ........ 370/328; 370/310; 370/343; 370/344; 370/350; 455/522

(58) Field of Classification Search .................. 370/208, 370/210, 241, 252, 328–329, 331–335, 341–344, 370/350, 203, 205–206, 295, 310; 455/39, 455/62, 63.1, 63.13, 422.1, 423–425, 550.1, 455/560–561, 500, 513, 67.11, 133–134, 455/188.1, 266, 418–420, 516–517, 522, 455/524–525, 556.2; 708/403–405, 821–825; 375/260, 267
See application file for complete search history.

(56) References Cited

U.S. PATENT DOCUMENTS

| | | | |
|---|---|---|---|
| 6,091,932 A * | 7/2000 | Langlais | 725/111 |
| 6,941,485 B2 * | 9/2005 | Nomura et al. | 713/501 |
| 7,139,320 B1 * | 11/2006 | Singh et al. | 375/260 |
| 7,283,498 B2 * | 10/2007 | Ro et al. | 370/333 |
| 7,450,654 B2 * | 11/2008 | Singh et al. | 375/260 |
| 2005/0031050 A1 * | 2/2005 | Kim et al. | 375/267 |
| 2005/0157637 A1 | 7/2005 | Feng et al. | |
| 2006/0039451 A1 | 2/2006 | Zhuang et al. | |
| 2006/0078040 A1 | 4/2006 | Sung et al. | |

FOREIGN PATENT DOCUMENTS
KR    10-2004-0081313 A    4/2006

OTHER PUBLICATIONS

Hyoungsoo Lim et al. "Initial Synchronization for WiBro", Electronics and Telecommunications Research Institute, Oct. 5, 2005, p. 284-288. Xiangyang (Jeff) Zhuang et al. "GCL-based Preamble Design for 1024,512 and 128 FFT Sizes in The OFDMA PHY Layer", IEEE, Aug. 29, 2004, p. 1-29.

* cited by examiner

*Primary Examiner* — Meless N Zewdu
(74) *Attorney, Agent, or Firm* — Birch, Stewart, Kolasch & Birch, LLP

(57) ABSTRACT

The invention provides an FFT-size detection method and system and a cell search method and system based on FFT-size detection, and more particularly to a cell search method based on FFT-size detection in cellular system. The cell search method utilizes two frames to correctly detect the actual cell ID. The cell search method uses the first frame to detect the actual FFT size of a received signal. When the FFT size is determined, the cell search method use the second frame to detect the cell ID of a base station outputting the received signal based on the FFT size.

6 Claims, 8 Drawing Sheets

FFT-SIZE DETECTOR AND FFT-SIZE DETECTION METHOD AND CELL SEARCH APPARATUS AND CELL SEARCH METHOD IN CELLULAR SYSTEM

BACKGROUND OF THE INVENTION

1. Field of the Invention

The invention relates to an FFT-size detection method and a cell search method based on FFT-size detection, and more particularly to a cell search method based on FFT-size detection in cellular system.

2. Description of the Related Art

In a cellular communication system, a subscriber station (SS) may receive downlink-transmitted signals from different cells or base stations, in response to subscriber station activation and may need to differentiate these signals using different cell codes or base station ID (BS ID). For example, in an OFDM-CDMA cellular system, the downlink-transmitted signals from different cells are differentiated using scrambling codes (cell codes), thereby allowing for reuse of frequency and spreading codes in contiguous cells. As such, an SS terminal, when switched on, locates a cell (i.e., synchronizing to the associated downlink scrambling code) before any communication. This procedure is known as initial cell search. During active or idle modes of an SS terminal, cell searching is also required to identify handoff candidates. This procedure is known as target cell search. The performance of cell search directly impacts the perceived switch-on delay, link quality and power consumption of an SS. Therefore, cell search is important for the design of OFDM based communication systems.

FIG. 1 shows the frame structure of the SCH-based cell search method. Each frame consists of M OFDM symbols. Each OFDM symbol comprises $N_{FFT}$ sample useful data and $N_{GI}$ sample cyclic prefix (CP, or called guard interval, GI) data for avoiding inter symbol interference (ISI) as well as inter-carrier interference (ICI). Accordingly, the length of an OFDM symbol, $N_{OFDM}$, is the sum of the length of useful data and cyclic prefix data. The downlink-transmitted signal in FIG. 1 includes common pilot channel (CPICH) signal, synchronization channel (SCH) signal, and traffic channel (TCH) signal. CPICH signal contains information about the scrambling code, and SCH signal about the group code and frame timing. TCH signal is used for transmitting TCH data.

In the receiver of an SS, the received signal is processed by the cell search procedure shown in FIG. 2. The procedure involves symbol synchronization to detect OFDM symbol timing (OFDM symbol boundary), frame synchronization and group identification to detect frame timing (frame boundary) and the group code, and scrambling-code identification to detect the scrambling code. In symbol synchronization, symbol timing is detected using the correlation property of CP. In frame synchronization and group identification, after removing GI from the received signal and performing N_FFT point discrete Fourier transform (DFT) (or, more efficiently, fast Fourier transform (FFT)), the frame timing and group code are simultaneously detected using SCH signal in frequency domain. In group identification, the scrambling code is identified from the detected group using CPICH signal, and verification is conducted to avoid false detection, thereby minimizing unnecessary MS activities.

BRIEF SUMMARY OF THE INVENTION

An embodiment of the invention provides a cell search method in a cellular system. The method comprises detecting an FFT size of a received signal; and detecting a cell ID of a base station outputting the received signal based on the FFT size.

Another embodiment of a cell search apparatus for a received signal is disclosed, comprising an FFT size detector, an FFT processing unit, and a cell ID search unit. The FFT size detector detects an FFT size of the received signal. The FFT processing unit transforms the received signal to frequency domain. The cell ID search unit receives the transformed received signal to detect a cell ID of the received signal. The cell search system comprises a plurality of cell ID search units corresponding to different FFT size, and only one cell ID search unit corresponding to the detected FFT size of the received signal is activated.

Another embodiment of the invention is an FFT detector for a received signal, wherein the FFT size of the received signal may be a first FFT size or a second FFT size, a first guard band is employed to the received signal when the FFT size of the received signal is the first FFT size, and a second guard band is employed to the received signal when the FFT size of the received signal is the second FFT size, the detector comprising a guard band energy calculator, an energy comparator and a processing unit. The guard band energy calculator calculates a first energy of the position of the first guard band of the received signal, and a second energy of the position of the second guard band of the received signal. The energy comparator receives the first energy and the second energy to output a first difference. The processing unit determines the FFT size of the received signal is the first FFT size or the second FFT size based on the first difference.

Another embodiment of the invention is an FFT detection method for a received signal, wherein the FFT size of the received signal may be a first FFT size or a second FFT size, a first guard band is employed to the received signal when the FFT size of the received signal is the first FFT size, and a second guard band is employed to the received signal when the FFT size of the received signal is the second FFT size, the method comprising: calculating a first energy of the position of the first guard band of the received signal, and a second energy of the position of the second guard band of the received signal; calculating a first difference between the first energy and the second energy; calculating a first absolute value derived from first difference; wherein if the first absolute value does not exceed a first predetermined value, the FFT size of the received signal is the first FFT size, and if the first absolute value exceeds a first predetermined value, the FFT size of the received signal is the second FFT size.

Another embodiment of the invention is an FFT detection method for a received signal, wherein the received signal may have at least three different FFT size, and each FFT size corresponds to a guard band, the method comprising: calculating energies at the positions of the possible guard bands of the received signal; calculating a plurality of differences between any two of the energies; determining a threshold value; determining the actual FFT size of the received signal based on comparison results between the differences and the threshold.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is one of the best-contemplated mode of carrying out the invention. This description is made for the purpose of illustrating the general principles of the invention and should not be taken in a limiting sense. The scope of the invention is best determined by reference to the appended claims.

Figure 1:
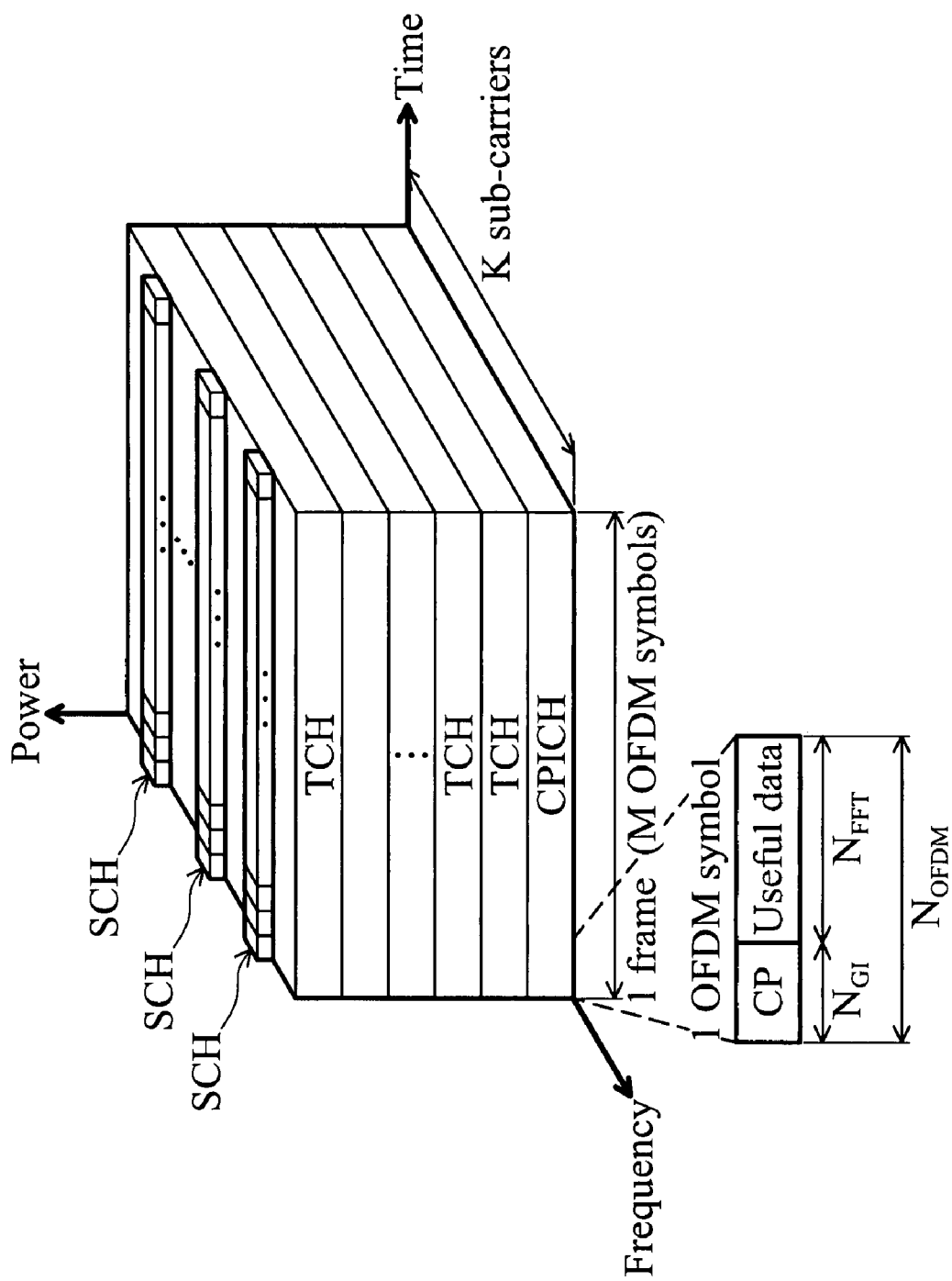
FIG. 1 shows the frame structure of a SCH-based cell search method. Each frame comprises M OFDM symbols.
Figure 2:
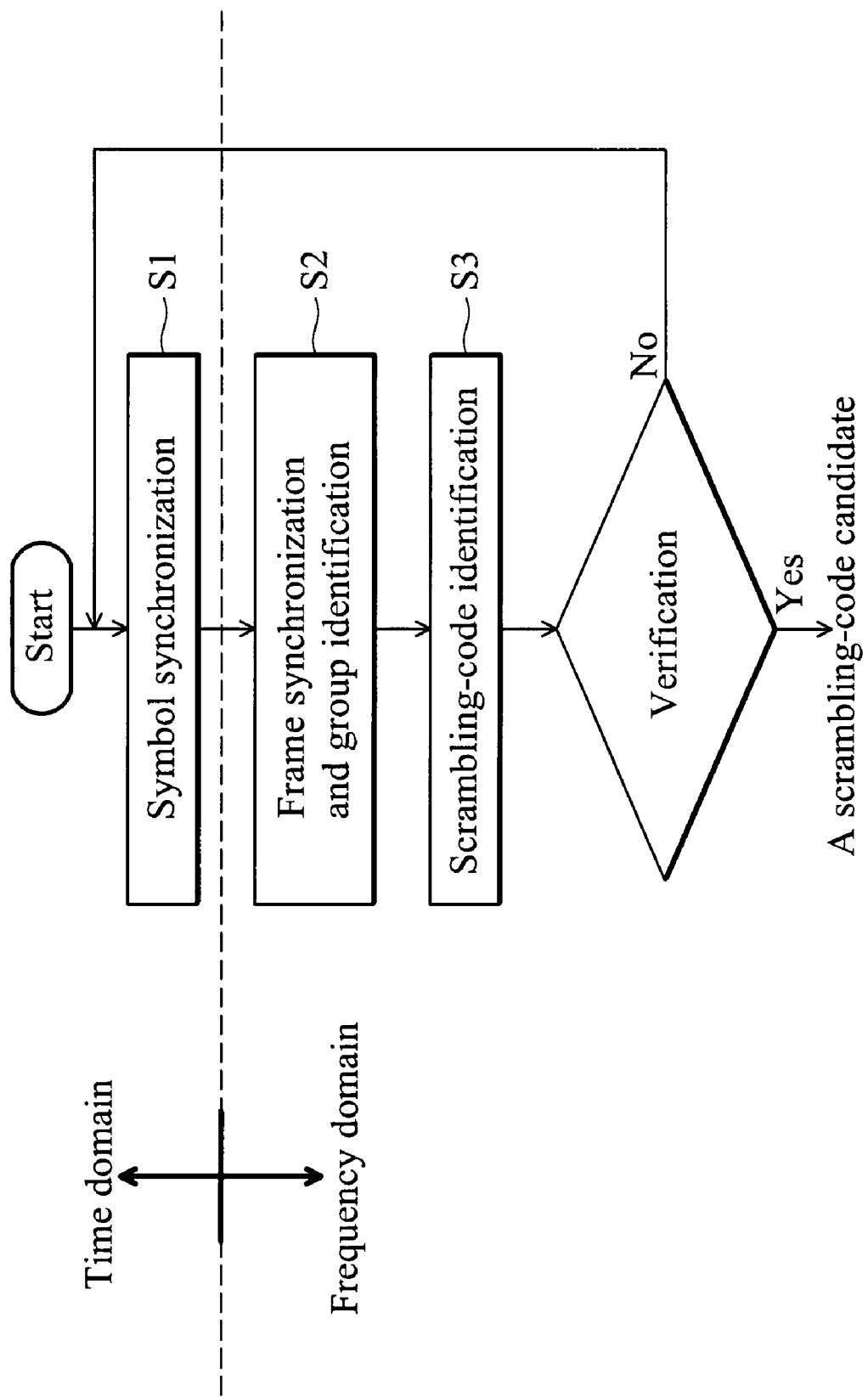
FIG. 2 is a flowchart of a cell search procedure.
Figure 3:
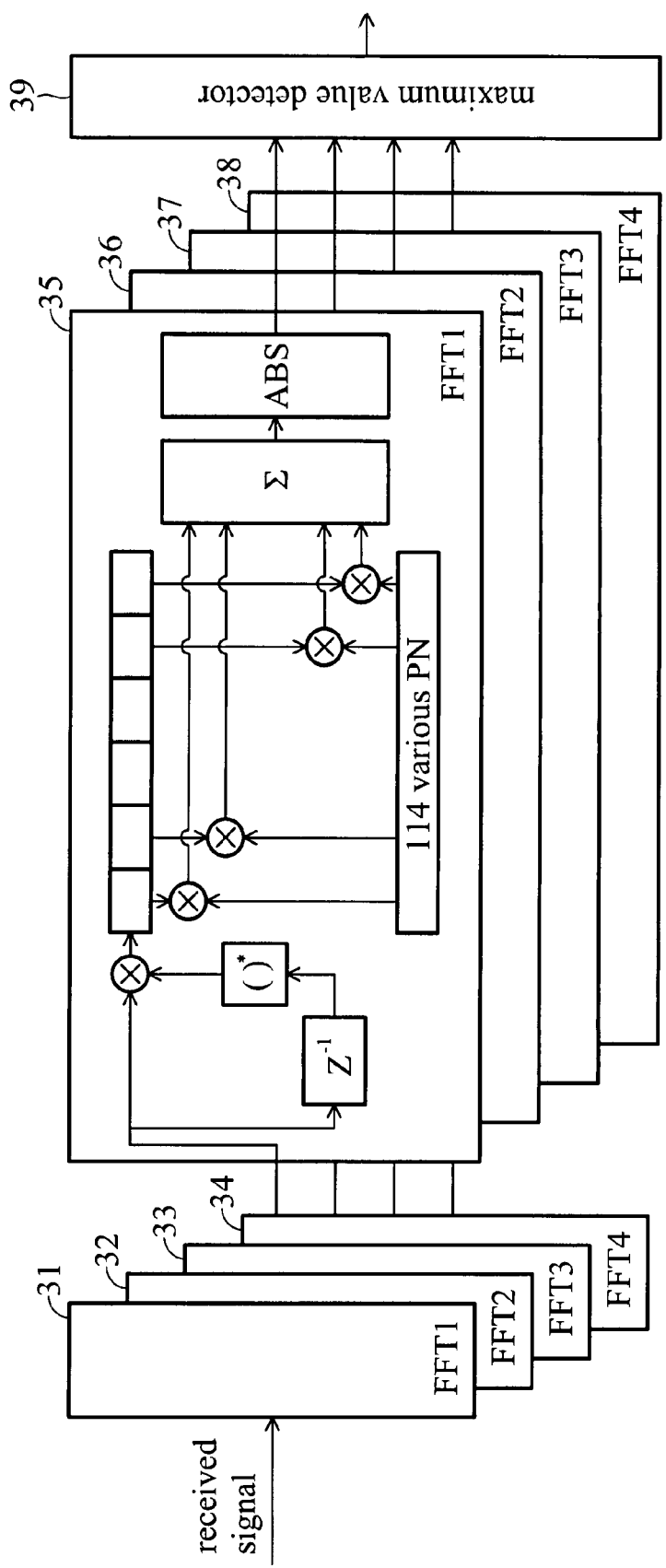
FIG. 3 is a functional block diagram of a cell search method.

FIG. 3 is a functional block diagram of a cell ID search method. Take WiMAX system as one embodiment. In WiMAX system, the bandwidth is scalable, i.e., different subcarriers occupy different bandwidths, and different bandwidths correspond to different FFT sizes. In WiMAX system, FFT sizes of 128 sample points, 512 sample points, 1024 sample points, and 2048 sample points, are provided. In FIG. 3, the received signal is transmitted to four Fast Fourier Transform units (FFT units) 31 to 34 and four cell search units 35 to 38 then receives and processes the output signals from corresponding FFT units. The maximum value detector 39 receives four processing results from the cell search units to find the cell ID based on the maximum processing result.

According to the architecture of the cell ID search functional block in FIG. 3, the hardware and software resource costs are considerable, and the architecture too complex to quickly detect the cell ID.

Figure 4:
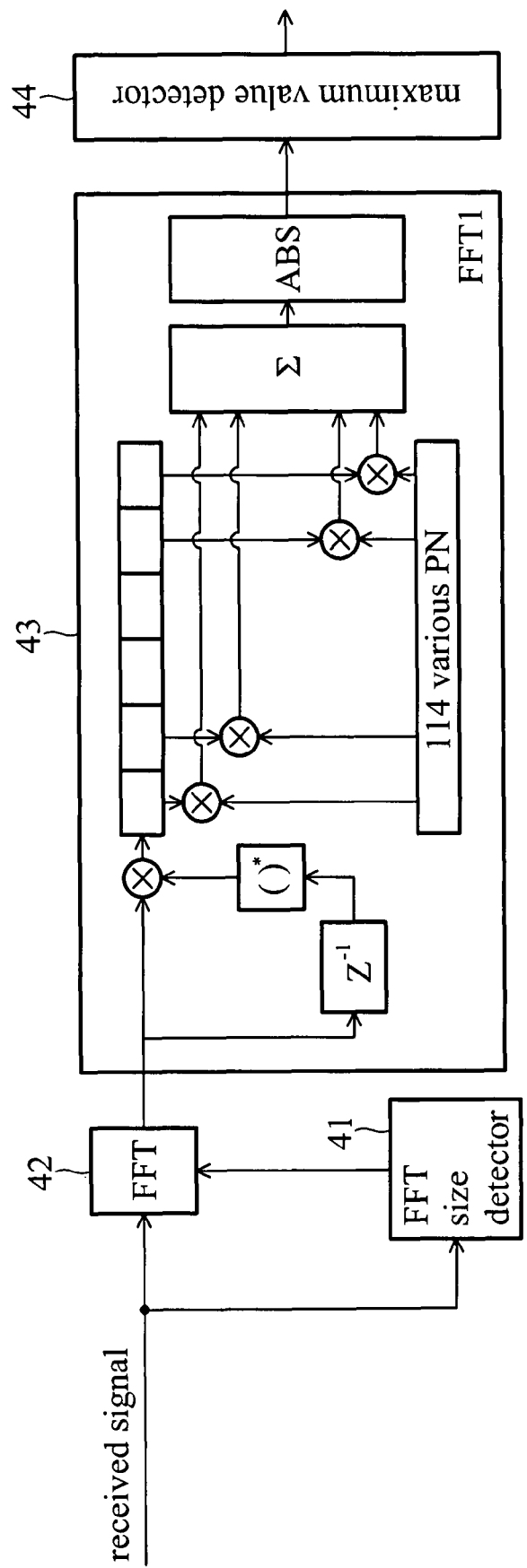
FIG. 4 is a functional block diagram of an embodiment of a cell search method with FFT size detection.

FIG. 4 is a functional block diagram of an embodiment of a cell search method with FFT size detection. An FFT size detector 41 is applied to detect the FFT size of the received signal, and transmits result to corresponding FFT unit 42. The FFT size detector 41 receives the first frame of the received signal to determine the actual FFT size of the received signal, and the actual FFT size of the received signal is then transmitted to the FFT unit 42. In one embodiment, the FFT unit 42 may have a plurality of FFT processing units, not shown in FIG. 4, with different FFT size, and the FFT unit 42 selects the corresponding FFT processing unit to process the received signal to reduce the hardware resource. According to the described operation, the FFT unit 42 correctly processes the received signal with the correct FFT size at the second frame of the received signal. If we want to use only one frame to find the BS ID, thus, an one-frame delay buffer can be employed before the received signal entering the FFT unit 42. The cell search unit 43 processes the data from the FFT unit 42 and transmits the operation results to a maximum value detector 44 to find the BS ID. According to the cell search architecture with FFT size detection of the invention, hardware resource requirements are significantly reduced.

Figure 5:
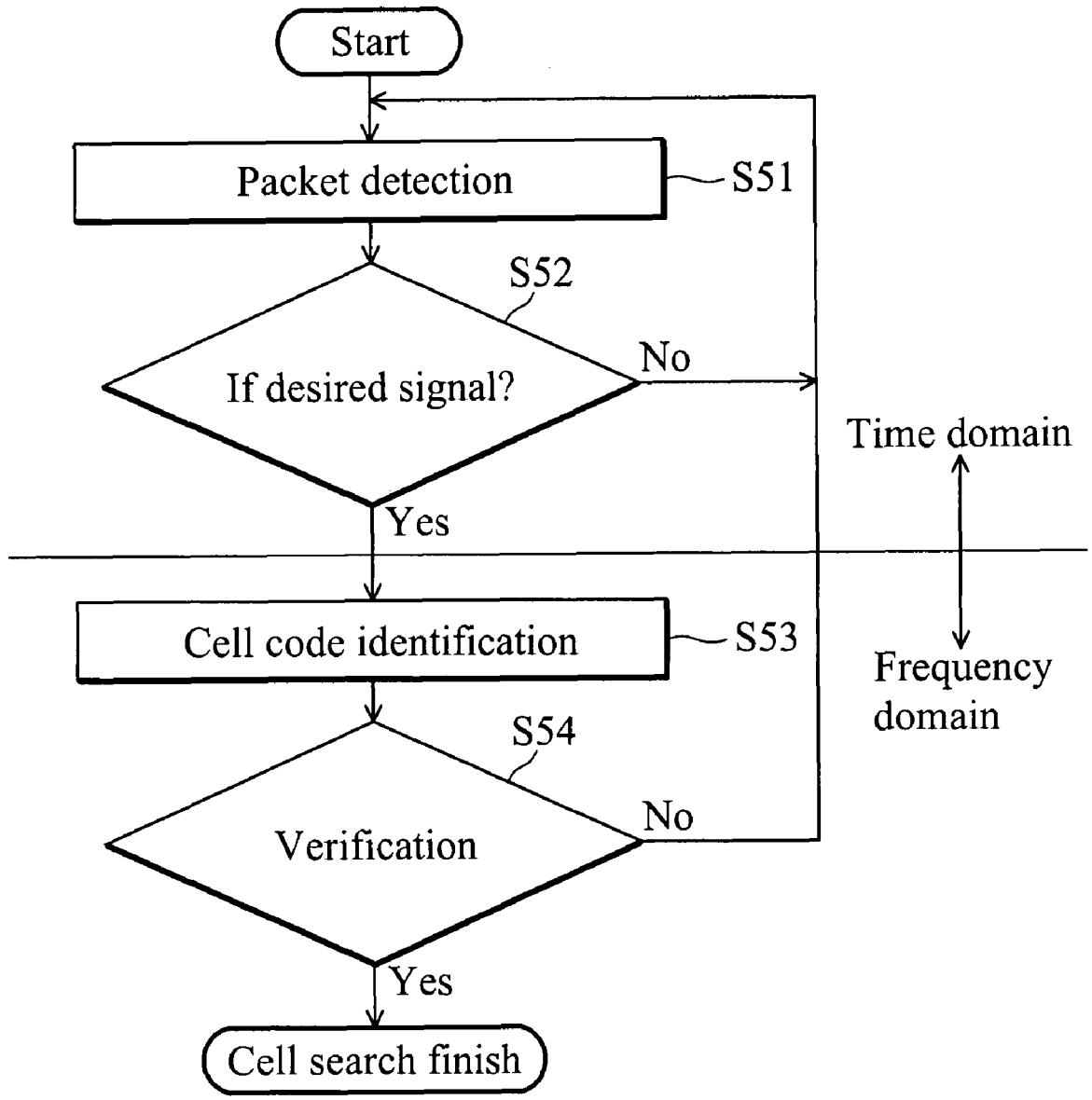
FIG. 5 is a flowchart of an embodiment of a cell searching method of the invention.

FIG. 5 is a flowchart of an embodiment of the cell searching method of the invention. In step S51, the subscriber station receives and detects the format of the received packet. In step S52, the subscriber station determines whether the received packet is the desired signal or not. If so, the received packet is converted from time domain to frequency domain. In step S53, a cell code identification procedure is applied on the received packet, and in step S54, the subscriber station verifies if the BS ID from step S53 is the desired BS ID. If so, the method is complete, and if not, step S51 is repeated.

The WiMAX system comprises four types of channel bandwidth, each corresponding to different FFT size, i.e., 128-FFT for 1.25 MHz BW, 512-FFT for 5 MHz, 1024-FFT for 10 MHz, and 2048-FFT for 20 MHz. When an SS enters a network for the first time, a cell search scheme is applied to search supported channel bandwidths and FFT sizes to locate the desired channel bandwidth and FFT size.

In FIG. 4, the FFT size detector 41 comprises an FFT processing unit with a maximum FFT size to transform the received signal to frequency domain from time domain. For example, if the WiMAX signal is 128-FFT size, 512-FFT size, 1024-FFT size, and 2048-FFT size, the FFT size of the FFT processing unit is set to 2048 FFT.

Figure 6:
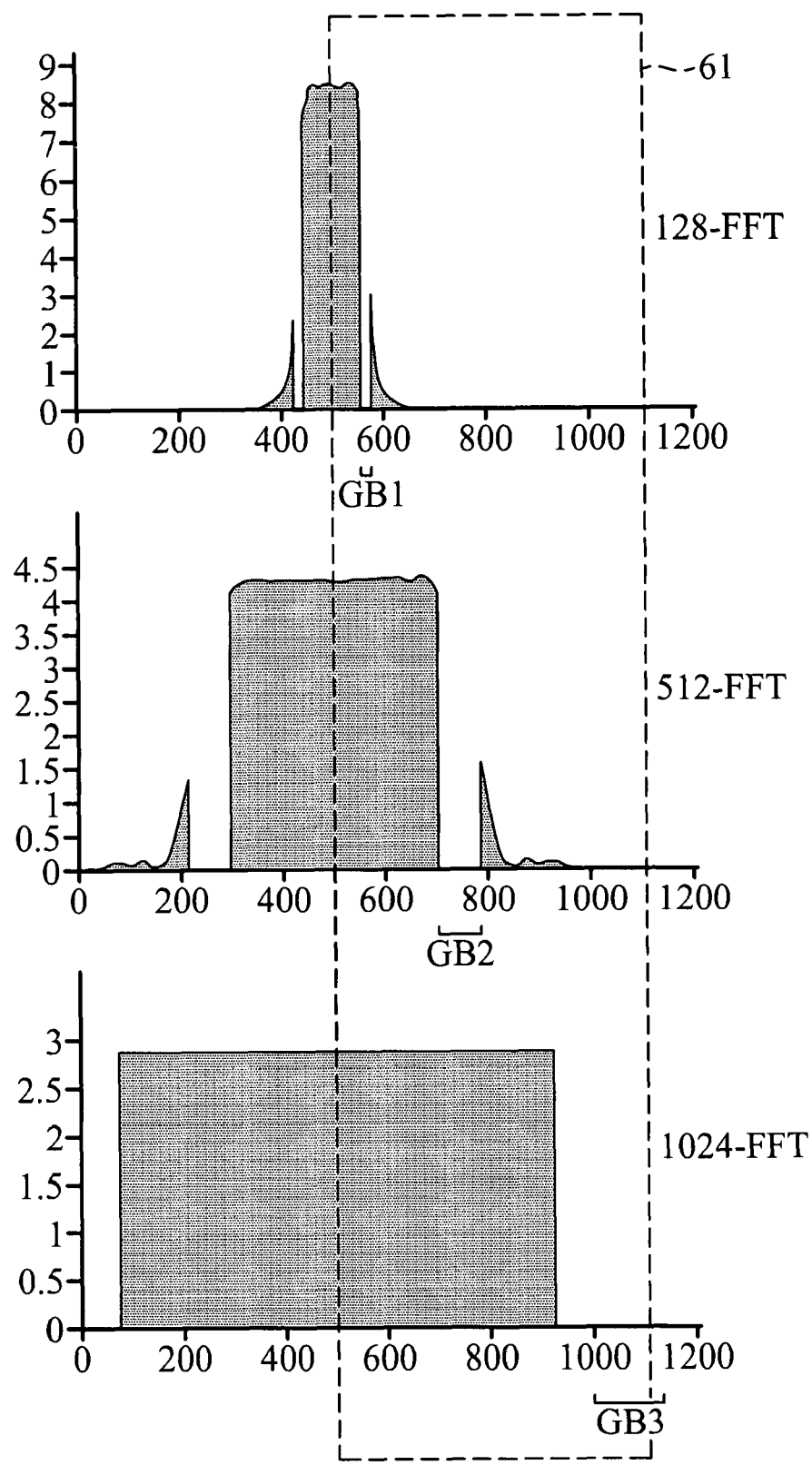
FIG. 6 is a schematic diagram an energy spectrum illustrating FFT size detection.

In the invention, the FFT size detector utilizes a frequency domain energy comparator to detect the FFT size. In the following, three FFT sizes, 128-FFT, 512-FFT and 1024 FFT, are illustrated for FFT size detection. FIG. 6 is a schematic diagram of an energy spectrum illustrating FFT size detection. Due to the symmetry characteristics of the energy spectrum, in this embodiment, only the energy spectrum in dotted frame 61 is discussed. In this embodiment, the guard band (GB) energy spectrums are used for FFT size detection. In FIG. 6, GB1 is the guard band position of 128-FFT, GB2 is the guard band position of 512-FFT, and GB3 is the guard band position of 1024-FFT. In FIG. 6, it is found that the energies of GB1, GB2 and GB3 in corresponding frequency spectrum diagrams are close to zero, thus, FFT size can be determined by the difference between any two energies among three guard band positions in the frequency spectrum diagram.

Figure 7:
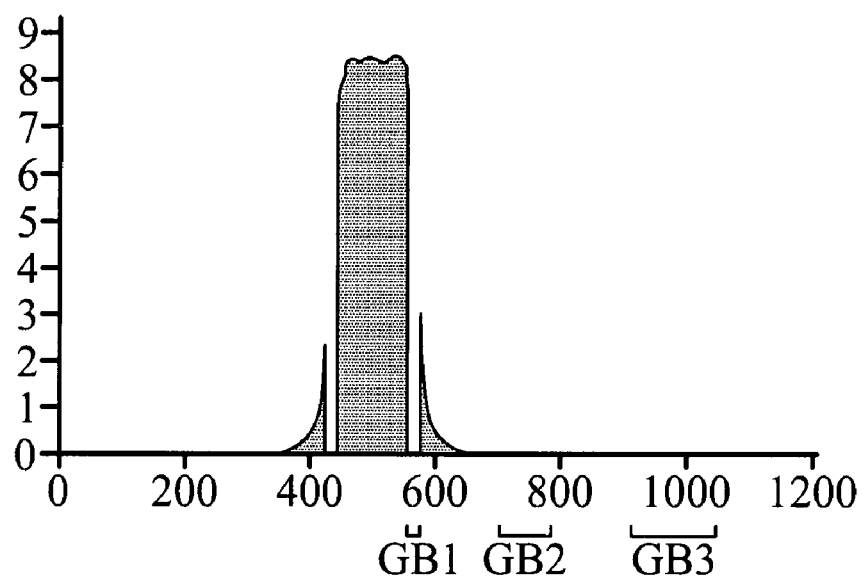
FIG. 7 is a frequency spectrum diagram of a 128-FFT received signal.

FIG. 7 is a frequency spectrum diagram of a 128-FFT received signal. Ideally, the energies in GB1, GB2 and GB3 are zero in the 128-FFT energy spectrum, but even though energies in GB1, GB2 and GB3 are still small, and the differences therebetween smaller, the following condition for determining the 128-FFT size can be applied $$(|E_{GB3}-E_{GB2}|<A1) \text{ and } (|E_{GB2}-E_{GB1}|<A2) \text{ and}$$
$$(|E_{GB1}-E_{GB3}|<A3), \quad \text{Condition I}$$

wherein $E_{GB1}$ denotes the energy of the GB1, $E_{GB2}$ denotes the energy of the GB2, $E_{GB3}$ denotes the energy of the GB3, A1, A2 and A3 denote thresholds.

When the frequency spectrum generated by an FFT processing unit in an FFT size detector, such as the FFT size detector 41 in FIG. 4, satisfies the condition I, the FFT size of the received signal is 128-FFT.

Figure 8:
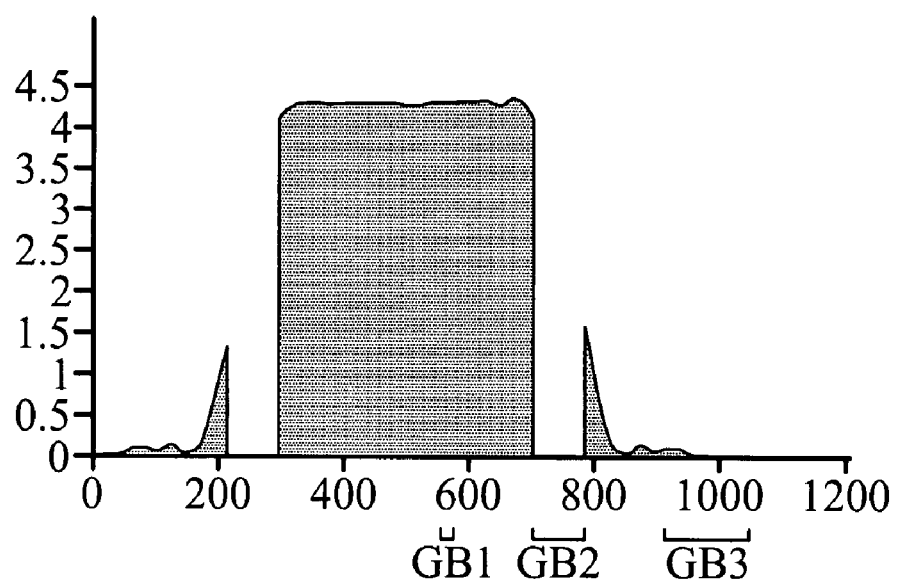
FIG. 8 is a frequency spectrum diagram of a 512-FFT received signal.

FIG. 8 is a frequency spectrum diagram of a 512-FFT received signal. In an ideal situation, the energies in GB2 and GB3 are zero, and the energy in GB1 is large in the 512-FFT energy spectrum. Therefore, the differences between the energies in GB1 and GB2 or GB3 exceed a predetermined threshold, and the difference between the energies in GB2 and GB3 very small, and the difference may be a negative or positive value. Therefore, the following condition for determining the 512-FFT size can be applied $$(|E_{GB3}-E_{GB2}|<A1) \text{ and } (|E_{GB1}-E_{GB2}|>A2) \text{ and}$$
$$(|E_{GB1}-E_{GB3}|>A3), \quad \text{Condition II}$$

wherein $E_{GB1}$ denotes the energy of the GB1, $E_{GB2}$ denotes the energy of the GB2, $E_{GB3}$ denotes the energy of the GB3, A1, A2 and A3 denote thresholds.

When the frequency spectrum generated by an FFT processing unit in an FFT size detector, such as the FFT size detector 41 in FIG. 4, satisfies the condition II, the FFT size of the received signal is 512-FFT.

If the frequency spectrum generated by an FFT processing unit in an FFT size detector does not satisfy the conditions I and II, the FFT size of the received signal is 1024-FFT.

Although the described embodiment uses the guard band for illustration, those skilled in the art can select other positions in the frequency by which the FFT size in different received signal can be identified based on a specific determining rule, such as the conditions I and II. If the received signal has N types of FFT size, N positions are required to complete the FFT size detection.

Figure 9:
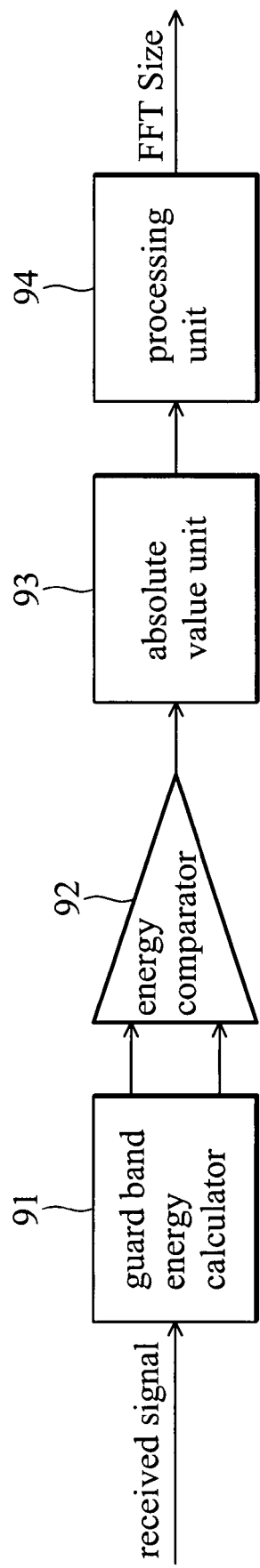
FIG. 9 is a block diagram of an FFT size detector of one embodiment of the invention.

FIG. 9 is a block diagram of an FFT size detector of one embodiment of the invention. The FFT detector is employed to determine the actual FFT size of a received signal, wherein in this embodiment, the FFT size of the received signal may be a first FFT size or a second FFT size. A first guard band is employed to the received signal when the FFT size of the received signal is the first FFT size, and a second guard band is employed to the received signal when the FFT size of the received signal is the second FFT size. A guard band energy calculator 91 receives the received signal to calculate a first energy of the position of the first guard band of the received signal, and a second energy of the position of the second guard band of the received signal. An energy comparator 92 receives and compares the first energy and the second energy to output a first difference. Since the first difference may be a negative value and this may cause wrong determination of the FFT size of the received signal, the first difference is transmitted to an absolute value unit 93 to calculate a first absolute value. The processing unit 94 receives the first absolute value to determine the actual FFT size of the received signal. In one embodiment, if the first absolute value does not exceed a first predetermined value, the FFT size of the received signal is the first FFT size, and if the first absolute value exceeds a first predetermined value, the FFT size of the received signal is the second FFT size.

In another embodiment, the received signal may have three or more different FFT size, skill in the art can easily combine the embodiments of FIG. 6 and FIG. 9 to know how to determine the FFT size of the received signal which may have three or more different kinds of FFT size.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An FFT detector of a cell ID search apparatus, wherein a FFT size of a received signal is a first FFT size or a second FFT size, wherein when a first guard band is employed to the received signal, the FFT size of the received signal is the first FFT size, and wherein when a second guard band is employed to the received signal, the FFT size of the received signal is the second FFT size, the FFT detector comprising:
    a guard band energy calculator to calculate a first energy at a position of the first guard band of the received signal, and a second energy at a position of the second guard band of the received signal;
    an energy comparator receiving the first energy and the second energy to output a first difference between the first energy and the second energy; and
    a processing unit to determine the FFT size of the received signal is the first FFT size or the second FFT size based on the first difference.

2. The detector as claimed in claim 1, further comprising an absolute value unit receiving the first difference to output a first absolute value.

3. The detector as claimed in claim 2, wherein if the first absolute value does not exceed a first predetermined value, the FFT size of the received signal is the first FFT size.

4. The detector as claimed in claim 2, wherein if the first absolute value exceeds a first predetermined value, the FFT size of the received signal is the second FFT size.

5. An FFT detection method executed by a FFT detector of a cell ID search apparatus for a received signal, wherein the FFT size of the received signal is a first FFT size or a second FFT size, wherein a first guard band is employed to the received signal when the FFT size of the received signal is the first FFT size, and wherein a second guard band is employed to the received signal when the FFT size of the received signal is the second FFT size, the method comprising:
    calculating a first energy at a position of the first guard band of the received signal, and a second energy at a position of the second guard band of the received signal;
    calculating a first difference between the first energy and the second energy; and
    calculating a first absolute value derived from the first difference;
    wherein when the first absolute value does not exceed a first predetermined value, the FFT size of the received signal is the first FFT size, and when the first absolute value exceeds the first predetermined value, the FFT size of the received signal is the second FFT size.

6. An FFT detection method executed by a FFT detector of a cell ID search apparatus for a received signal, wherein the received signal has at least three different FFT sizes, and each FFT size corresponds to a guard band, the method comprising:
    calculating energies at positions of possible guard bands of the received signal;
    calculating a plurality of differences between any two of the calculated energies;
    determining a threshold value of the differences; and
    determining an actual FFT size of the received signal based on comparison results between the differences and the threshold.

\* \* \* \* \*

UNITED STATES PATENT AND TRADEMARK OFFICE
CERTIFICATE OF CORRECTION

Page 1 of 1

PATENT NO. : 7,933,239 B2
APPLICATION NO. : 11/812046
DATED : April 26, 2011
INVENTOR(S) : Huei-Jin Lin et al.

It is certified that error appears in the above-identified patent and that said Letters Patent is hereby corrected as shown below:

ON THE TITLE PAGE:

Please insert the following:

-- Related U.S. Application Data

(60) Provisional application No. 60/831,932, filed on July 20, 2006. --

Signed and Sealed this
Twenty-sixth Day of July, 2011

David J. Kappos
*Director of the United States Patent and Trademark Office*